United States Patent
Ueyama et al.

[11] Patent Number: 5,916,628
[45] Date of Patent: Jun. 29, 1999

[54] METHOD FOR MANUFACTURING A CELL ELECTRODE

[75] Inventors: Yasuhiro Ueyama, Osaka; Kunio Tsuruta, Nara; Yorihito Ohana; Toshikazu Nakamura, both of Osaka, all of Japan

[73] Assignee: Matsushita Electric Industrial Co., Ltd., Osaka, Japan

[21] Appl. No.: 08/756,660

[22] Filed: Nov. 26, 1996

[30] Foreign Application Priority Data

Nov. 28, 1995 [JP] Japan .................................. 7-309126

[51] Int. Cl.$^6$ ........................... B05D 5/12; B05D 1/12; H01M 4/02; H01M 6/00
[52] U.S. Cl. ........................ 427/115; 427/58; 427/180; 29/623.3; 29/623.5; 429/209
[58] Field of Search .......................... 427/58, 115, 180; 29/623.3, 623.5; 429/218, 212, 209

[56] References Cited

U.S. PATENT DOCUMENTS

| | | | |
|---|---|---|---|
| 4,046,690 | 9/1977 | Rodgers et al. | 427/180 |
| 4,217,939 | 8/1980 | Vanagihara et al. | 141/1.1 |
| 4,788,764 | 12/1988 | Niksa et al. | 29/623.1 |
| 5,346,787 | 9/1994 | Chaloner-Gill | 429/218 |
| 5,358,801 | 10/1994 | Brodd | 429/218 |
| 5,382,609 | 1/1995 | Lock | 427/180 |
| 5,419,890 | 5/1995 | Saidi | 429/218 |
| 5,589,297 | 12/1996 | Koga et al. | 429/218 |
| 5,595,837 | 1/1997 | Olsen et al. | 429/218 |
| 5,660,948 | 8/1997 | Barker | 429/218 |

FOREIGN PATENT DOCUMENTS

| | | |
|---|---|---|
| 55-155470 | 12/1980 | Japan . |
| 60-127661 | 7/1985 | Japan . |
| 61-135055 | 6/1986 | Japan . |
| 2-158055 | 6/1990 | Japan . |
| 3-263757 | 11/1991 | Japan . |

*Primary Examiner*—Marianne Padgett
*Attorney, Agent, or Firm*—Merchant, Gould, Smith, Edell, Welter & Schmidt, P.A.

[57] ABSTRACT

A cell that is excellent in discharge characteristics and cycle characteristics is provided by filtering an active material paste, which contains an active material, a binder resin solution, and a conducting agent added as required, at least one time by a filter while stirring the active material paste in a stirring apparatus that has a stirring blade, and then coating a current collector with the active material paste. An active material paste is circulated and filtered by a feeding pump and a filter while being stirred in a stirring apparatus that has a stirring blade. Then, the active material paste is fed to another filter by a metering pump and filtered, and then, a current collector (backing) is coated with the active material paste. Then, the active material paste is dried in a dry zone and taken up by a take-up roller.

10 Claims, 3 Drawing Sheets

METHOD FOR MANUFACTURING A CELL ELECTRODE

FIELD OF THE INVENTION

The present invention relates to a method for manufacturing a cell electrode, and, particularly, to a method for manufacturing a cell electrode in which undispersed agglomerates contained in the active material pastes of a positive electrode and a negative electrode are removed.

BACKGROUND OF THE INVENTION

Recently, electronics apparatuses having smaller size have been manufactured, and accordingly, smaller size and higher capacity for a cell as a power source have been highly desired. Various factors such as the material and manufacturing method of a primary cell and a secondary cell have been examined. Particularly, as described in Laid-open Japanese Patent Application No. (Tokkai sho) 55-155470, Laid-open Japanese Patent Application No. (Tokkai sho) 60-127661, Laid-open Japanese Patent Application No. (Tokkai sho) 61-135055, Laid-open Japanese Patent Application No. (Tokkai hei) 2-158055, and Laid-open Japanese Patent Application No. (Tokkai hei) 3-263757, the examination of the manufacturing method and the fact that the manufacturing method affects cell capacity have been reported.

In conventional methods for manufacturing a paste, a poor part was created by discontinuity in the paste in coating due to the undispersed agglomerates contained in an active material paste, and therefore the yield was decreased. Also, an electrode after coating and drying had a rough surface, and many protruding grains were observed. When a cell was manufactured by using an electrode that contains many such undispersed agglomerates, and a cycle test was repeated, deterioration in discharge capacity was severe, and the deposition of a reactant that includes such protruding grains was also seen. Also, when using an active material paste that has many agglomerates, the weight of the film coating a current collector was not uniform, and an agglomerate part was separated from a base material, resulting in remarkable deterioration in discharge capacity and many variations in cell capacity. Therefore, an improvement in a method for manufacturing an active material paste has been desired.

SUMMARY OF THE INVENTION

In order to solve the conventional problems as mentioned above, the present invention aims to provide a cell that has improved discharge characteristics by removing the undispersed agglomerates in the active material pastes of a positive electrode and a negative electrode to obtain a uniform electrode.

In order to achieve the above object, a method for manufacturing a cell electrode of the present invention comprises coating a surface of a current collector with an active material paste, stirring the active material paste in a stirring apparatus that has a stirring blade prior to coating the current collector, and filtering the active material paste to remove undispersed agglomerates of active material prior to coating the current collector.

In the above method, a means for filtering the active material paste is preferably provided between the stirring apparatus for the active material paste and a means for coating a surface of a current collector with the active material paste.

In the above method, filtration of the active material paste is preferably performed by a recycle line comprising a means for feeding the active material paste and a means for filtering the active material paste in series.

In the above method, filtration of the active material paste is preferably performed by a recycle line comprising a means for feeding the active material paste and a means for filtering the active material paste in series, and by a filtering means provided between the stirring apparatus for the active material paste and a means for coating a surface of a current collector with the active material paste.

In the above method, the filter for filtering the active material paste is preferably at least one selected from a film, a fabric, a non-woven fabric, and a net made by using a fiber or a wire which is made of a metal material, an organic material, or a composite material thereof.

In the above method, the mesh size of the filter for filtering the active material paste is within the range of 5 $\mu$m to 1 mm.

With the present invention, the active material paste flows due to the motion of the stirring blade in the stirring apparatus, and precipitation and separation of an active material can be prevented by not allowing the active material paste to stand still, and therefore the active material paste can be stably preserved. Also, by performing filtration using a filter, the undispersed agglomerates in the active material paste can be removed to eliminate discontinuity in the paste and the grains in a dried coated film, and therefore uniform coating properties can be obtained. Due to these actions, the stability of the paste can be ensured, and the impurity can be removed. Therefore, a cell that has a good yield of the material, improved cycle characteristics, few variations, and good discharge characteristics can be provided.

DETAILED DESCRIPTION OF THE INVENTION

Figure 1:
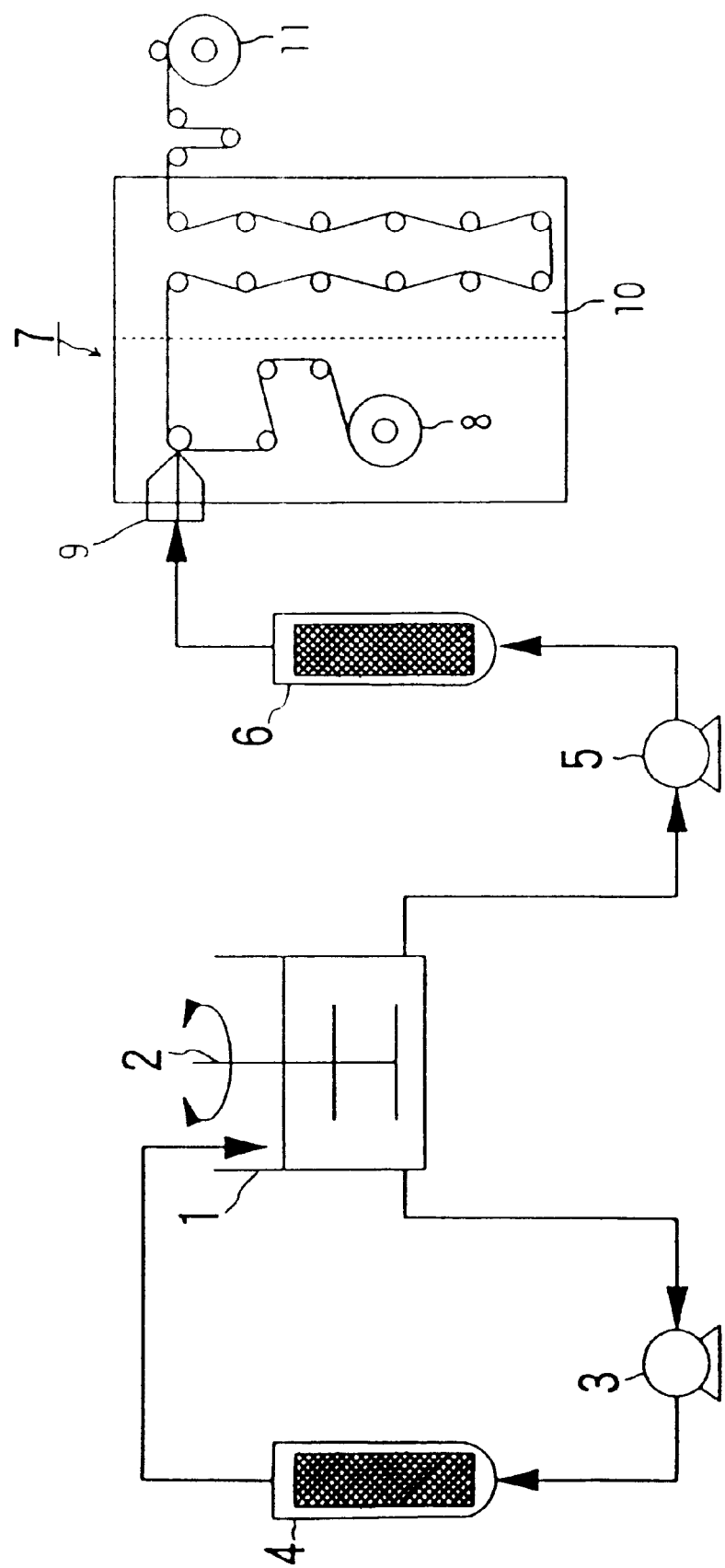
FIG. 1 shows a method for manufacturing a cell electrode according to an example of the present invention.

The present invention will be described more in detail below. FIG. 1 is an example of a method for manufacturing a paste and a coating method that can be used in the present invention. 1 indicates a stirring apparatus for stirring an active material paste, and the stirring apparatus may comprise a cooling apparatus for the purpose of preventing heat accumulation due to the stirring action. This stirring apparatus 1 comprises a stirring vessel and a stirring blade 2. Stirring blade 2 comprises an axis of rotation and a blade part. The shape of the stirring blade used in the present invention need not be limited to a specific shape. A disk-like shape, a stick-like shape, a plate-like shape, a helical-ribbon-like shape, etc. may be used. The stirring in the present invention may be circular motion around the axis of rotation or reciprocating motion with respect to the circumferential direction around the axis of rotation. Most preferably, a stirring apparatus that maintains such flow that the bubbles in the active material paste are effectively removed by the motion of a stirring blade is used. Also, in general, when using a stirring apparatus that constantly stirs a paste, precipitation and separation of an active material can be prevented, and therefore the paste properties can be improved, and stable preservation is possible.

The active material paste used in the present invention is prepared by mixing an active material and a binder solution in stirring apparatus 1. Also, the active material paste may be fed or put into stirring apparatus 1 after being prepared in advance by a kneading apparatus such as a continuous type biaxial kneading apparatus or a batch type kneading apparatus, a pressure type homogenizer, an ultrasonic homogenizer, a line mill, or a sand mill, for example. 3 indicates a feeding pump. A pump used as the feeding pump is preferably a pump that has a sliding part formed of a metal and a material other than metal, such as a Neoprene rubber or a silicon rubber, or a pump that has small sliding surfaces between metal parts. 4 indicates a filter. Examples of the filter may be a film, a net, a mesh fabric, etc. made by using a fiber or a wire which is made of an organic material such as a polyester fiber or a nylon fiber, or a metal material using a stainless steel fiber, a nickel fiber, etc., or a composite material thereof. A lattice net made of a metal fiber that is commonly called a strainer may be used. The minimum limit of the mesh size of a filter is based on the particle size of the active material. However, the mesh size of a filter is preferably within the range of 5 $\mu$m to 1 mm, more preferably 20 $\mu$m to 0.5 mm. If the mesh size of a filter is less than 5 $\mu$m, the pressure loss is large when the paste passes through the filter. Therefore, the filtration time becomes longer, and the function is poor. Also, if the mesh size of a filter is larger than 1 mm, the agglomerates in the paste can not be completely removed, and therefore the cell characteristics deteriorate. A process for filtering the active material may be one time, however, if the filtering process is performed by circulating the process one time or more, better refining effects can be obtained. Also, when performing the process one time or more, the mesh size may be gradually made smaller. By changing the mesh size smaller, the agglomerates in the paste can be gradually removed. The active material paste is circulated to remove the agglomerates in the paste by using a feeding pump 3 and a filter 4.

The active material paste having the agglomerates removed is then fed to a filter 6 by using a metering pump 5. When coating a base material with the active material paste, a pump that is excellent in metering a constant amount is preferably used in order to obtain an electrode having a uniform thickness by coating with the paste fed in a constant amount. Filtration by filter 6 may be performed before coating. A material used for filter 6 may be the same material that is used for filter 4. The active material paste filtered in filter 6 is then fed to an coating apparatus 7.

In coating apparatus 7, first, a current collector (backing) is fed from a supply roller 8. As the backing, a metal foil selected from an aluminium foil, a copper foil, a nickel foil, an expanded metal (a sponge-metal that contains nickel as the main component), etc. is used. The fed backing is coated with the active material paste by a coater 9. As coater 9, a reverse roll method, a gravure method, a knife-coater method, a kiss-coater method, a die-coater method, etc. may be used. If the film density after coating does not reach enough density to ensure the cell density, a rolling process, a calender process, etc. may be performed. An example of the thickness of the active material paste for coating is 100 $\mu$m after drying. Then, the active material paste is dried in a dry zone 10, for example, at 120° C. for a few minutes. Then, the active material paste is taken up by a take-up roller 11, for example, at a speed of 10 m/min.

The active material paste used in the present invention may contain an active material having a metal oxide, a metal hydrate, a metal powder, or a carbonaceous material as the main material, a conducting agent, a binder resin, etc.

Examples of the carbonaceous material may include a carbon black, a graphite, and an organic sintered body. Examples of the conducting agent may include a carbon fiber and an acetylene black.

Examples of the binder resin used in the present invention may include a resin solution in which a carboxymethyl cellulose (hereinafter CMC), a poly(vinyl alcohol), a fluororesin, a formal resin, an acetal resin, a resin from copolymerization of an acrylic and styrene, a resin from copolymerization of styrene and butadiene (hereinafter SBR resin), etc. is dissolved or emulsified. A solvent need not be limited to a specific solvent. N-methylpyrrolidone, toluene, methyl ethyl ketone, methyl isobutyl ketone, cyclohexanone, ethanol, methanol, butyl acetate, distilled water, etc. may be used.

According to the present invention as detailed above, by the above structure, that is, by filtering an active material paste with a filter at least one time while stirring the active material paste in a stirring apparatus that has a stirring blade, the paste can be stably preserved while the bubbles in the paste are removed, and the undispersed agglomerates in the active material pastes of a positive electrode and a negative electrode can be removed to obtain uniform coating properties. Therefore, a cell that has a good yield of the material and few variations and is excellent in cycle characteristics and discharge characteristics can be provided.

Examples will be described below. An apparatus used in the following examples is as shown in FIG. 1.

The present invention will be described below as examples of a method for manufacturing a lithium secondary cell.

1) Manufacture of Positive Electrode [Positive electrode sample No.1]

100 parts by weight of $LiCoO_2$ having an average particle diameter of 2 $\mu$m, 5 parts by weight of conductive carbon black whose secondary particle has an average particle diameter of 1 $\mu$m, 5 parts by weight of 40 wt. % polytetrafluoroethylene (PTFE) water emulsion resin (a commercially available article), and an aqueous solution having 1 wt. % CMC were kneaded by using a continuous type biaxial kneading apparatus, and filtered by a filter made of stainless steel having a mesh size of 0.1 mm while being stirred in a stirring apparatus that has a stirring blade reciprocating around the axis of rotation. Then, the both surfaces of an aluminium foil were coated with the filtered materials in an amount of 300 g/m² (after drying), and the coating materials were dried to manufacture a positive electrode.

2) Manufacture of Negative Electrode [Negative electrode sample No. 1]

100 parts by weight of spheroidal graphite having an average particle diameter of 2 $\mu$m, 3 parts by weight of 40 wt. % SBR water emulsion resin (a commercially available article), and an aqueous solution having 1 wt. % CMC were kneaded by using a continuous type biaxial kneading apparatus, and filtered by a filter made of stainless steel having a mesh size of 0.05 mm while being stirred in a stirring apparatus that has a stirring blade reciprocating around the axis of rotation. Then, the both surfaces of a copper foil were coated with the filtered materials in an amount of 140 g/m² (after drying), and the coating materials were dried to manufacture a negative electrode.

[Negative electrode sample No. 2]

The same process as in negative electrode sample No. 1, except that the mesh size of the stainless filter in negative electrode sample No. 1 was 0.2 mm, was performed to obtain a negative electrode.

[Negative electrode sample No. 3]

The same process as in negative electrode sample No. 1, except that the mesh size of the stainless filter in negative electrode sample No. 1 was 0.8 mm, was performed to obtain a negative electrode.

[Negative electrode sample No. 4]

The same process as in negative electrode sample No. 1, except that coating was performed without the filtration in negative electrode sample No. 1, was performed to obtain a negative electrode.

[Negative electrode sample No. 5]

The same process as in negative electrode sample No. 1, except that coating was performed without the stirring in negative electrode sample No. 1, was performed to obtain a negative electrode.

[Negative electrode sample No. 1']

100 parts by weight of spheroidal graphite having an average particle diameter of 2 μm, 3 parts by weight of 40 wt. % SBR water emulsion resin (a commercially available article), and an aqueous solution having 1 wt. % CMC were kneaded by using a continuous type biaxial kneading apparatus. Then, the both surfaces of a copper foil were coated with the kneaded materials in an amount of 140 g/m² (after drying), and the coating materials were dried to manufacture a negative electrode.

[Negative electrode sample No. 2']

The same process as in negative electrode sample No. 1, except that the mesh size of the stainless filter in negative electrode sample No. 1 was 1.2 mm, was performed to obtain a negative electrode.

EXAMPLE 1

Positive electrode sample No. 1 and negative electrode sample No. 1 were rolled through a separator to manufacture a cylindrical lithium secondary cell that has a diameter of 17 mm and a height of 50 mm.

EXAMPLE 2

Positive electrode sample No. 1 and negative electrode sample No. 2 were rolled through a separator to manufacture a cell having the same size.

EXAMPLE 3

Positive electrode sample No. 1 and negative electrode sample No. 3 were rolled through a separator to manufacture a cell having the same size.

EXAMPLE 4

Positive electrode sample No. 1 and negative electrode sample No. 4 were rolled through a separator to manufacture a cell having the same size.

EXAMPLE 5

Positive electrode sample No. 1 and negative electrode sample No. 5 were rolled through a separator to manufacture a cell having the same size.

COMPARATIVE EXAMPLE 1

Positive electrode sample No. 1 and negative electrode sample No. 1' were rolled through a separator to manufacture a cell having the same size.

COMPARATIVE EXAMPLE 2

Positive electrode sample No. 1 and negative electrode sample No. 2' were rolled through a separator to manufacture a cell having the same size.

The following evaluation was made for each sample thus obtained. As a comparative sample, a cell having the same size that is obtained in a conventional process was used.

1) Discharge capacity [%]

The sample was charged at a constant current (500 mA) and a final voltage (4.2 V) at room temperature. Then, the sample was discharged at a constant current (500 mA), and the ratio of the discharge capacity of each sample to that of the comparative sample, i.e. when the voltage that decreased from the start of discharge reached a final voltage (3.0 V), was evaluated.

Figure 2:
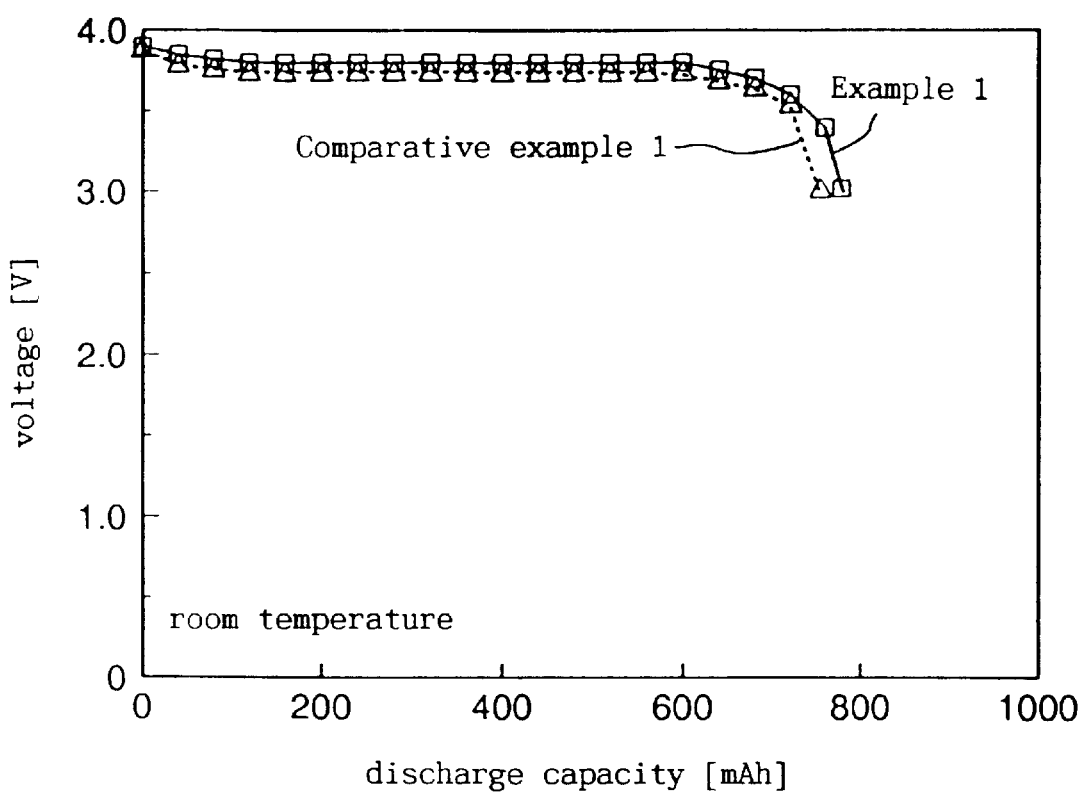
FIG. 2 shows the relationship of discharge voltage and discharge capacity for a cell according to an example of the present invention and a comparative example.

FIG. 2 is an example of the curve of discharge voltage when discharge capacity was measured.

2) Cycle life [%]

The ratio of the number of times of the charge and discharge of each sample to that of the comparative sample when the discharge capacity reached 90% of the initial discharge capacity while charge and discharge were repeated under constant conditions (discharge: a current of 500 mA and a final voltage of 3.0 V, charge: a current of 500 mA and a final voltage of 4.2 V) at room temperature to measure discharge capacity.

Figure 3:
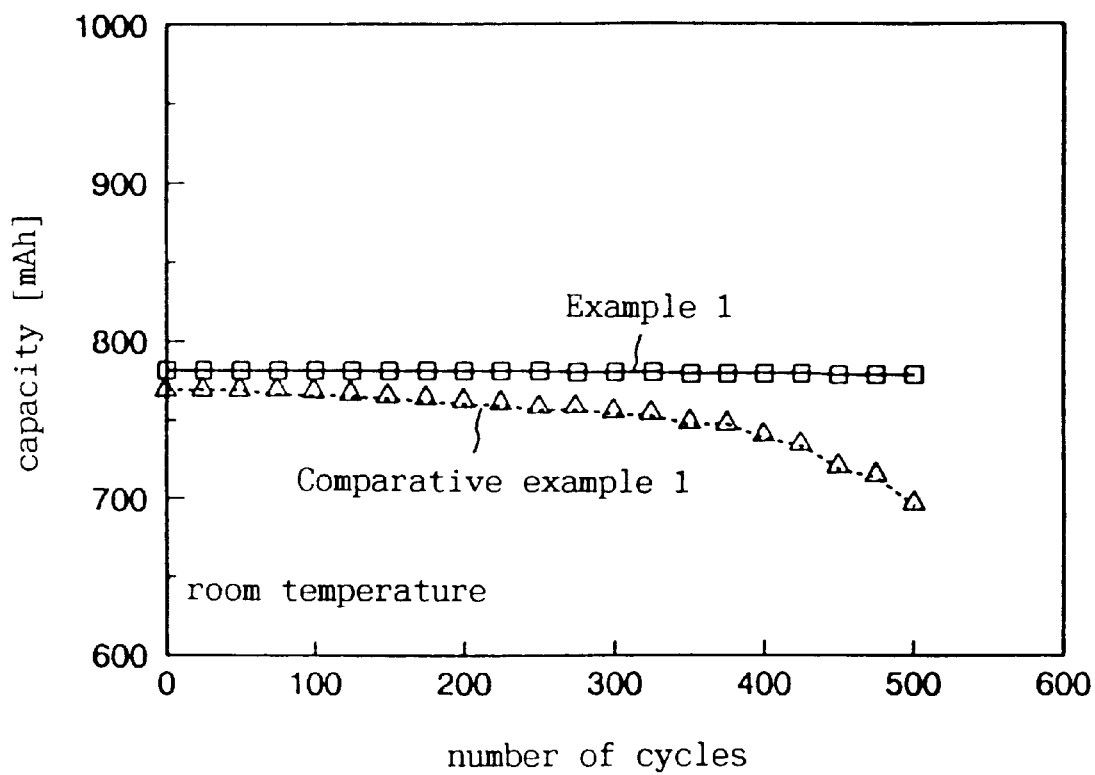
FIG. 3 shows a change in discharge capacity with respect to cycle life for a cell according to an example of the present invention and a comparative example.

FIG. 3 is an example of a change in discharge capacity with respect to the number of times of charge and discharge when a cycle life was measured.

3) Deposition of lithium on a negative electrode

The cell was diassembled after the cycle life was measured, and the deposition of lithium on the negative electrode was visually observed.

The results of the measurement of the examples are shown in Table 1.

TABLE 1

|   |   | Examples | | | | | Comparative examples | |
|---|---|---|---|---|---|---|---|---|
|   |   | 1 | 2 | 3 | 4 | 5 | 1 | 2 |
| * | *** | with | with | with | with | without | without | with |
|   | mesh size (mm) | 0.05 | 0.2 | 0.8 | — | 0.05 | — | 1.2 |
| ** | **** | 108 | 112 | 105 | 105 | 110 | 95 | 90 |
|   | cycle life (%) | 112 | 110 | 108 | 105 | 105 | 90 | 90 |
|   | ***** | ****** | ****** | ****** | ****** | ****** | observed | ovserved |

*process for manufacturing a paste
**measurement results
***stirring process
****discharge capacity (%)
*****visual observation of lithium deposition
******not observed As is apparent from Table 1, the cells in the examples were excellent in any of mesh size, discharge capacity, a cycle life, and visual observation of lithium deposition.

In the invention in the above examples, it was confirmed that a cell that is excellent in discharge characteristics and cycle characteristics is obtained by filtering an active material paste containing an active material, a binder resin solution, and a conducting agent added as required at least one time by a filter while stirring the active material paste in a stirring apparatus that has a stirring blade, and then coating a current collector with the active material paste.

While only the method for manufacturing a negative electrode of a lithium secondary cell is described in the examples of the present invention, similar effects were obtained in the method for manufacturing a positive electrode. Also, similar effects were obtained in a positive electrode and a negative electrode of a nickel-cadmium cell or a nickel-hydrogen cell.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A method for manufacturing a cell electrode, comprising forming a paste of an active material for a current collector of a cell electrode;

stirring the active material paste in a stirring apparatus that has a stirring blade;

filtering the active material paste to remove undispersed agglomerates of active material, wherein the filtering of the active material paste is performed by a recycle line, comprising a means for feeding the active material paste from the stirring apparatus to a first filter for the filtering, then returning the filtered active material paste that has passed through the first filter to the stirring apparatus; and coating a surface of the current collector with the active material paste from which the undispersed agglomerates have been filtered, wherein the stirring and the filtering is carried out prior to the coating of the current collector.

2. The method according to claim 1, wherein further filtration of the active material paste is performed by a second filter provided between the stirring apparatus for the active material paste and a coater for the coating the surface of the current collector with the active material paste.

3. The method according to claim 1, wherein the first filter for filtering the active material paste is at least one selected from a film and a fabric.

4. The method according to claim 2, wherein the first filter and the second filter are independently at least one selected from a film and a fabric.

5. The method according to claim 1, wherein a mesh size of the first filter for filtering the active material paste is within a range of 5 $\mu$m to 1 mm.

6. The method according to claim 2, wherein mesh sizes of the first and the second filters are within a range of 5 $\mu$m to 1 mm.

7. The method according to claim 1, wherein the active material paste comprises the active material and a binder solution.

8. The method according to claim 3, wherein the fabric is at least one selected from a non-woven fabric and a net, the fabric made by using a fiber or a wire which is made of a metal material, an organic material, or a composite material thereof.

9. The method according to claim 2, wherein the first filter and the second filter are a material independently selected from a non-woven fabric and a net, the material made by using a fiber or a wire which is made of a metal material, an organic material, or a composite material thereof.

10. The method according to claim 1, wherein the stirring reduces precipitation of the active material in the active material paste.

* * * * *